United States Patent
Trosman et al.

(10) Patent No.: US 8,559,586 B2
(45) Date of Patent: *Oct. 15, 2013

(54) DISTRIBUTED CLUMPING OF PART-LENGTH RODS FOR A REACTOR FUEL BUNDLE

(75) Inventors: Lukas Trosman, Wilmington, NC (US); Cary L. Kunz, Wilmington, NC (US); Russell E. Stachowski, Wilmington, NC (US); Russell M. Fawcett, Atkinson, NC (US); Shingo Fujimaki, Yokohama (JP); Daisuke Goto, Kamakura (JP)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1206 days.

This patent is subject to a terminal disclaimer.

(21) Appl. No.: 10/748,174

(22) Filed: Dec. 31, 2003

(65) Prior Publication Data

US 2005/0157837 A1    Jul. 21, 2005

(51) Int. Cl.
*G21C 3/32* (2006.01)

(52) U.S. Cl.
USPC .......................... 376/435; 376/444

(58) Field of Classification Search
USPC .......................... 376/435, 444, 428
See application file for complete search history.

(56) References Cited

U.S. PATENT DOCUMENTS

| | | | | |
|---|---|---|---|---|
| 4,968,479 A * | 11/1990 | Ogiya et al. | ................. | 376/428 |
| 5,068,082 A * | 11/1991 | Ueda et al. | ................. | 376/435 |
| 5,192,496 A * | 3/1993 | Soneda et al. | ................. | 376/435 |
| 5,229,068 A * | 7/1993 | Johansson et al. | ................. | 376/371 |
| 5,327,472 A | 7/1994 | Kraemer et al. | | |
| 5,339,342 A | 8/1994 | Meier et al. | | |
| 5,432,829 A * | 7/1995 | Aoyama et al. | ................. | 376/435 |
| 6,335,956 B1 * | 1/2002 | Koyama et al. | ................. | 376/435 |
| 6,600,800 B2 * | 7/2003 | Bender et al. | ................. | 376/435 |
| 6,728,329 B2 * | 4/2004 | Hirano et al. | ................. | 376/435 |
| 6,735,267 B2 * | 5/2004 | Orii et al. | ................. | 376/435 |

FOREIGN PATENT DOCUMENTS

| | | |
|---|---|---|
| JP | 5-232273 | 9/1993 |
| JP | 6-294879 | 10/1994 |
| JP | 10-115690 | 5/1998 |

OTHER PUBLICATIONS

Siemens. "ATRIUM Fuel Assemblies for Boiling Water Reactors", Nov. 1993, 9 pgs.
W. Kraemer et al. "The ULTRAFLOW Spacer—An Advanced Feature of ATRIUM Fuel Assemblies for Boiling Water Reactors." *Nuclear Engineering and Design*, 154 (1995), pp. 17-21.
K. V. Walters. "ATRIUM™-10 Lattice and Fuel Assembly Design." Siemens Power Corporation—Nuclear Division, pp. 3-1 to 3-7, 1997.
"ATRIUM™ Fuel Assembly with Reduced Pressure Loss: Premiere In Philippsburg 1", AD-EX Job No. 98471, pp. 1-3, 1997.
K. Tsuda et al. "An Advanced 9×9 Fuel Design with Offset Water-Channel for D-Lattice BWR Plants." BWR Fuel Engineering Department, Nuclear Fuel Industries, Ltd., 9 pgs., Nov. 5, 1996.

* cited by examiner

*Primary Examiner* — Johannes P Mondt
(74) *Attorney, Agent, or Firm* — Harness, Dickey & Pierce, P.L.C.

(57) ABSTRACT

A reactor fuel bundle includes both full-length fuel rods and part-length fuel rods. The part-length rods are clumped in two groups—a first rod group surrounds one or more water passages which are generally centrally disposed in a channel of the fuel bundle, and a second rod group is distributed about an inner perimeter wall of the channel.

3 Claims, 3 Drawing Sheets

⊘ Denotes Full - Length Fuel Rods

○ Denotes Part - Length Fuel Rods

◍ Denotes Full - Length Fuel Rods

○ Denotes Part - Length Fuel Rods

DISTRIBUTED CLUMPING OF PART-LENGTH RODS FOR A REACTOR FUEL BUNDLE

CROSS-REFERENCE TO RELATED APPLICATIONS

This application addresses similar subject matter to co-pending and commonly assigned U.S. patent application Ser. No. 10/748,175 filed concurrently herewith, entitled AXIALLY SEGREGATED PART-LENGTH FUEL RODS IN A REACTOR FUEL BUNDLE, by the inventors of the subject application.

BACKGROUND OF THE INVENTION b 1. Field of the Invention

The present invention relates in general to boiling water reactors and more specifically to an apparatus and method of construction for fuel bundles of boiling water reactors.

2. Related Art

Fuel bundles for boiling water reactors typically each provide a plurality of vertically stacked fuel rods. Common fuel bundles or fuel assemblies provide a square or rectangular shaped perimeter wall called a channel within which the fuel rods are positioned. Reactor coolant flowing through the boiling water reactor enters the bottom of the channel and passes vertically upward and longitudinally over the fuel rods where it is heated to form steam. The steam discharges from upper openings in the fuel bundle. Boiling water reactors may contain several hundred fuel bundles. One or more water passages are also commonly provided within fuel bundle assembly to maintain a source of water to slow down a sufficient quantity of neutrons to initiate and maintain reactor criticality.

The highest potential operating energy capability for a boiling water reactor is obtained if all fuel rods are full-length fuel rods. The disadvantage of using 100% full-length fuel rods is that reactor shut-down margin is not optimized. Following a reactor shut-down, fission does not immediately stop. Neutrons continue to fission, and it is necessary to trap sufficient neutrons to prevent inadvertent reactor criticality. Shut-down margin is therefore a sufficient percentage of trapped neutrons compared to fissioned neutrons which prevents criticality. Shut-down margin is commonly enhanced by distributing a quantity of part-length fuel rods in each fuel bundle. A vacant volume above each part-length fuel rod provides an additional water volume when the reactor is shut down. These additional water volumes trap neutrons to provide increased shut-down margin for the reactor. Common boiling water reactor fuel bundles have part-length fuel rods evenly distributed about the fluid flow channels but within an outer ring of full-length fuel rods.

The known configurations of part-length fuel rods in a fuel bundle do not achieve optimum reactor critical power and/or shut-down margin.

SUMMARY OF THE INVENTION

According to a exemplary embodiment of the present invention, a boiling water reactor comprises at least one fuel bundle having a perimeter wall and opposed openings. At least one fluid passage is disposed within the perimeter wall and extends between the opposed openings. A plurality of fuel rods are disposed within the perimeter wall, external to the fluid passage. The fuel rods include both full-length rods and part-length rods. The part-length rods are distributed in two rod groups. A first rod group includes part-length rods each distributed adjacent to the fluid passage. A second rod group includes part-length rods each distributed within and immediately adjacent to the perimeter wall. Each of the first and second groups includes at least one pair of adjacent part-length rods.

The full-length fuel rods distributed about the perimeter of the fuel bundle create a fuel rich zone. By distributing the part-length fuel rods in groups and locating one of the rod groups immediately adjacent to the perimeter wall of the fuel bundle, locally increased volumes of water are provided both adjacent and external to the full-length fuel rods. The part-length fuel rod group located immediately adjacent to the perimeter is further distributed in sub-groups each having one or, for example, pairs of part-length fuel rods. Following reactor shut-down, water flowing through the reactor accumulates above the grouped part-length fuel rods to form water traps. The water traps formed above the subgroups containing paired part-length fuel rods trap neutrons in greater quantities due to a larger local volume of water adjacent to the fuel rich zone of full-length fuel rods and a small reduction of total fuel immediately adjacent to the perimeter wall. Shut-down margin is therefore provided in a fuel bundle that better utilizes the part-length fuel rods.

Further areas of applicability of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the exemplary embodiment(s) is merely exemplary in nature and is in no way intended to limit the invention, its application, or uses.

Figure 1:
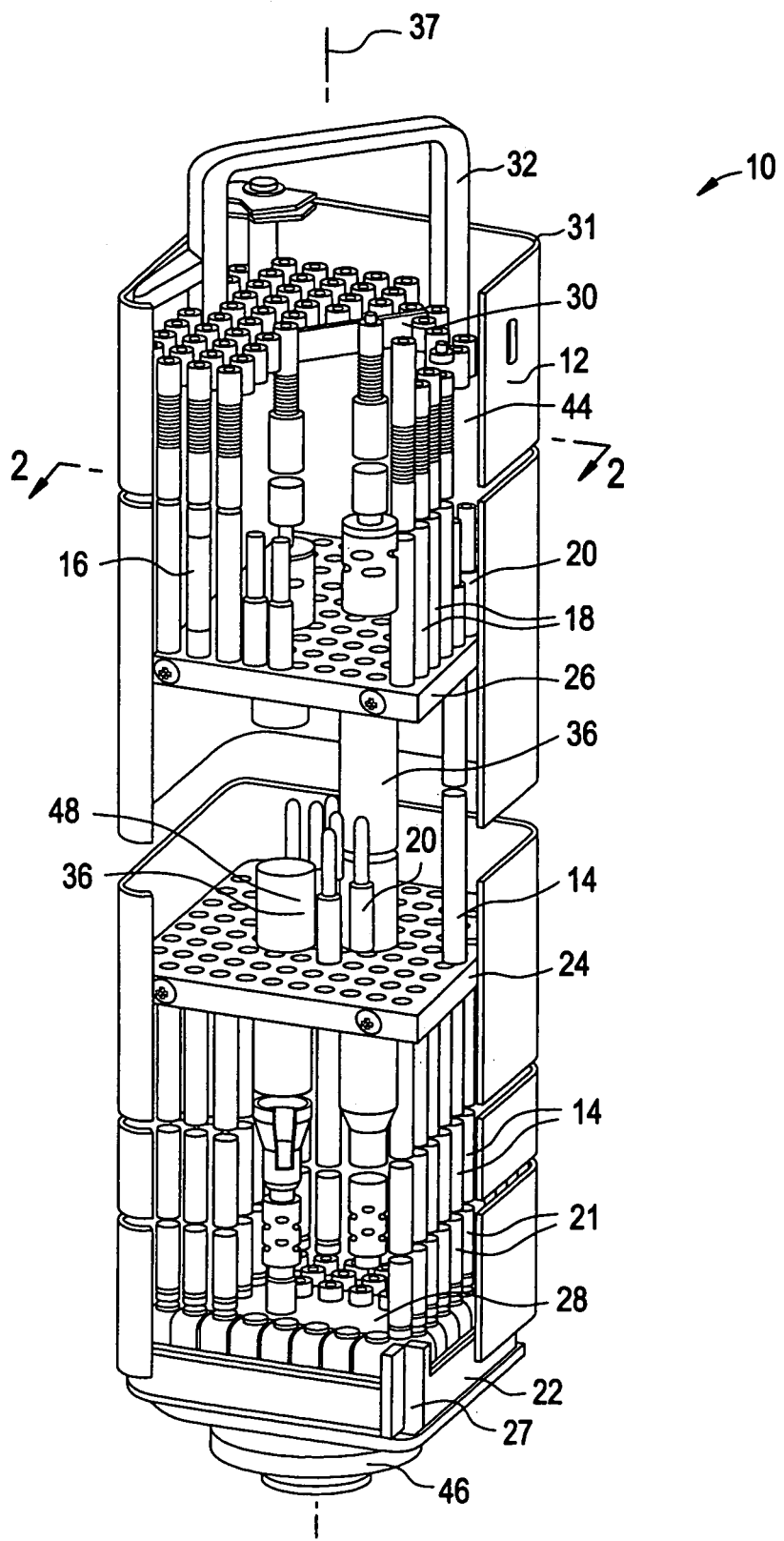
FIG. 1 is a perspective view of a fuel bundle for a exemplary embodiment of the present invention.

Referring to FIG. 1, a fuel bundle 10 of the present invention is shown. The fuel bundle 10 includes a channel 12 which encloses a plurality of fuel rods 14. Each of the fuel rods 14 contains a plurality of fuel pellets 16. The plurality of fuel rods 14 is divisible into a group of full-length fuel rods 18 and a group of part-length fuel rods 20. Each of the fuel rods 14 has a support end 21 supported by a lower rod support 22. An intermediate rod support 24 is provided to support the approximate mid-span of each of the full-length fuel rods 18 and a distal end of each of the part-length fuel rods 20. An upper rod support 26 is provided to support an upper end of each of the full-length fuel rods 18. Additional rod supports (not shown) can be used to support the fuel rods 14 as required.

A fuel bundle feed end 27 provides an inlet orifice 28 adjacent to the lower rod support 22 to allow an influx of water into the fuel bundle 10. Water flows upwardly through the fuel bundle 10 where it is heated to form steam. The steam discharges from a plurality of outlet orifices 30 located at a discharge end 31 of the fuel bundle 10. A lifting member 32 provides a mechanical lifting means for the fuel bundle 10 to install/remove the fuel bundle 10 into/out-of a boiling water reactor having a plurality of fuel bundles 10.

Figure 2:
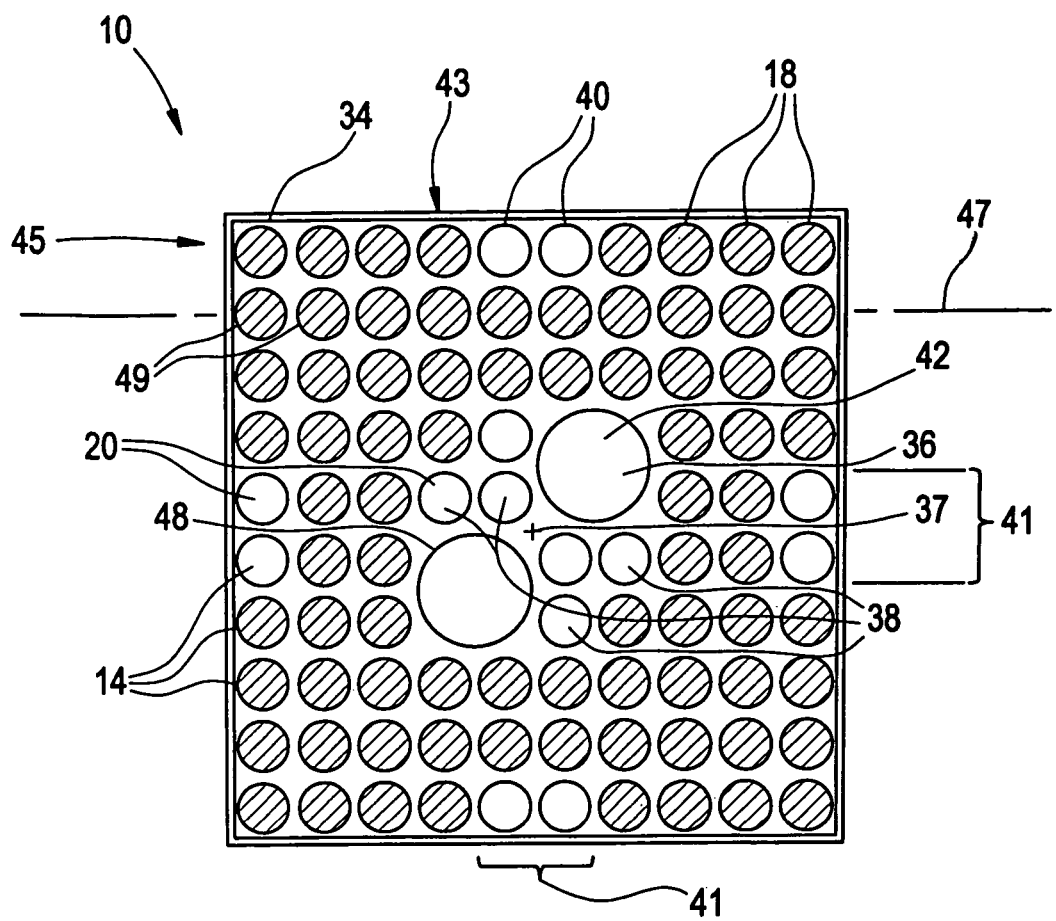
FIG. 2 is a sectioned view taken at Section 2-2 of FIG. 1 showing a exemplary arrangement of short-length fuel rods arranged in two rod groups according to the present invention.

As best seen in FIG. 2, the fuel bundle 10 also includes an inner perimeter wall 34 of the channel 12 housing the fuel rods 14 and one or more water passages 36. In the embodiment shown in FIG. 2, two water passages 36 are provided, each located adjacent to a longitudinal centerline 37 of the fuel bundle 10. The fuel rods 14 are arranged in a 10×10 row-and-column configuration having ten rows 43 and ten columns 45, within a generally square or rectangular shaped fuel bundle 10. Each fuel rod 14 is adjacent at least one other fuel rod 14 in either a "face-to-face" paired arrangement or a "face diagonal" paired arrangement. The face-to-face paired arrangement 49 results between two adjacent fuel rods coaxially aligned along a common centerline 47 (only an exemplary single centerline 47 is shown for clarity) taken through either one of the rows 43 or the columns 45 of fuel rods 14. The face diagonal arrangement results between two adjacent fuel rods which are not coaxially aligned along either one of the common centerlines 47 taken through the rows 43 or the columns 45 of fuel rods 14.

The part-length fuel rods 20 are arranged in two groups. A first rod group 38 is disposed adjacent to the water passages 36. The first rod group 38 includes two subgroups of part-length rods 20 disposed on opposite sides of the water passages 36. Each sub-group includes three part-length rods 20 forming two pairs of adjacent part-length rods 20. A second rod group 40 is disposed immediately adjacent to the inner perimeter wall 34 and is, for example, distributed as shown in FIG. 2 in adjacent subgroup pairs 41 of part-length fuel rods 20. Each subgroup pair 41 of part-length fuel rods 20, forming the second rod group 40, is distributed approximately mid-span along each straight portion of the inner perimeter wall 34. Each of the part-length fuel rods 20 which form the second rod group 40 are positioned in the face-to-face arrangement with each adjacent part-length fuel rod 20.

A plurality of fuel bundles 10 are installed into a reactor vessel (not shown) to form a boiling water reactor. When the boiling water reactor is in a shutdown or non-critical operating condition, water continuously flows (e.g., by externally provided pumps) through each fuel bundle 10 to maintain proper cooling for the reactor. During this condition, each of the water passages 36 fills with a water volume 42. A void above each of the part-length fuel rods 20 also fills with water. These voids act as water traps 44 (see FIG. 1), which together with the water volume 42, trap neutrons which continue to fission. By trapping neutrons, a shutdown margin is provided to prevent the reactor from achieving criticality at this undesired time. As best seen in FIG. 2, the plurality of part-length fuel rods grouped into the first rod group 38 and the second rod group 40 distribute clumped groups of part-length fuel rods such that clumped groups of water traps 44 are formed above sub-groups of the part-length fuel rods during the shutdown condition. The channel 12 also includes a channel connecting end 46 adjacent the channel feed end 27, which is used to connect the channel 12 into a boiling water reactor vessel (not shown). While the water passage 36 shown in this embodiment are formed as a pair of circular shaped tubes 48, one or more circular or other shaped tubes 48 may be used.

Figure 3:
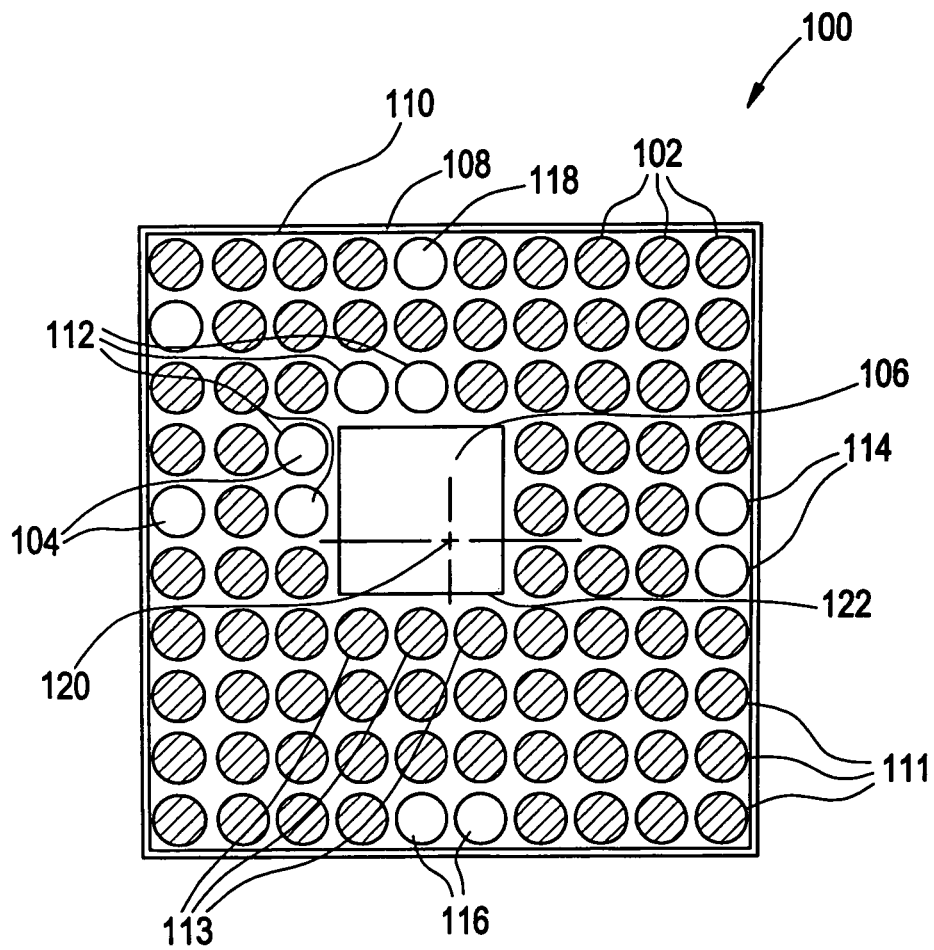
FIG. 3 is a sectioned view similar to FIG. 2 showing an alternate embodiment of the present invention having a single water passage in lieu of two water passages and an alternate arrangement of an external or perimeter rod group of the present invention.

Referring now to FIG. 3, an alternate embodiment of the present invention is shown. Items common with the embodiment of FIG. 2, including but not limited to the supports, orifices, lifting member, etc. are not shown for clarity. A fuel assembly 100 provides a plurality of full-length fuel rods 102 and a plurality of part-length fuel rods 104. A single square-shaped water passage 106 is provided in this embodiment. As shown, the single water passage 106 is located off center within the fuel bundle 100. It should be noted that the water passage 106 can also be centrally disposed within the fuel bundle 100. A channel 108 is formed in a square shape for the alternate embodiment shown for the fuel bundle 100. The channel 108 has an inner perimeter wall 110 similar to that shown in FIG. 2.

A 10×10 row-and-column arrangement of fuel rods is provided by the embodiment shown in FIG. 3, similar to that shown in FIG. 2. The invention is not limited to 10×10 arrangements of fuel rods, therefore, the 10×10 configuration shown is an exemplary arrangement of fuel rods. Similar to the arrangement of FIG. 2, each of the part-length fuel rods 104 is distributed in one of two rod groups. A first rod group 112 is disposed adjacent to the water passage 106. The first rod group includes two sub-groups disposed at one corner of the water passage 106. Each sub-group includes a pair of adjacent part-length rods 104. A second rod group 114 is distributed as paired part-length rods 116 and single part-length rods 118. The second rod group 114 is distributed about the perimeter of the fuel bundle 100 immediately adjacent to the inner perimeter wall 110. The water passage 106 is shown positioned off the longitudinal centerline 120 of the channel 108 and is represented as a rectangular-shaped tube 122.

Similar to the fuel bundle 10 described above with respect to FIGS. 1-2, the arrangement of the fuel bundle 100 provides the second rod group 114 having the paired part-length rods 116 and the single part-length rods 118 distributed approximately at the mid-span of each of the walls of the channel 108. Based on the 10×10 fuel rod configuration and the offset location of the water passage 106, single part-length rods 118 are located in a near-bisecting position along the inner perimeter wall 110. The location for the first rod group 112 and the second rod group 114 is exemplary in that the part-length rods 116, 118 can be distributed in alternate configurations from those shown in FIG. 3.

By increasing the overall neutron absorption rate using the first and second part-length rod groups of the present invention, an improved shutdown margin for a boiling water reactor is possible. The improved shutdown margin results by locally increasing the size of water traps above part-length fuel rods by pairing or grouping the part-length fuel rods on an external boundary of the fuel bundle and adjacent to the water passages. Selectively spaced, larger water traps in combination with the water passages provides improved shutdown margin and reduced potential for steam venting, without significantly reducing the reactor critical power ratio.

The description of the invention is exemplary in nature and, thus, variations that do not depart from the gist of the invention are intended to be within the scope of the invention. For example, circular and square water passage geometries are shown herein. Other geometries are also possible, including water passages which are formed simply by the elimination or relocation of fuel rods, which permits water flow through regions of the fuel bundle where fuel rods are not disposed. The water passages can therefore take their shape depending upon the available geometry of the fuel bundle. Rectangular, oval, cruciform or star-shaped water passages can also be used, either having external passage walls or as free flowing passages. Both single and paired water passages are shown herein, however, additional quantities of water passages may also be used.

It is also noted that a square fuel assembly is efficient for arranging an 8×8, a 9×9, or a 10×10 row-and-channel configuration of fuel rods, however the invention is not limited to a square fuel bundle. The invention can be used for any fuel bundle geometry provided that the part-length fuel rods are arranged in groups wherein at least one group is provided immediately adjacent to an exterior or perimeter wall of the fuel bundle, includes at least one part-length fuel rod, and is spaced from any corner of the fuel bundle by at least one full-length fuel rod. Such variations are not to be regarded as a departure from the spirit and scope of the invention.

What is claimed is:

1. A fuel bundle for a boiling water reactor, comprising:
a single, square-shaped water passage located off-center within a 10×10 fuel-rod matrix bounded by four sides of a generally square, hollow tube, the fuel rods including full-length and part-length fuel rods,
wherein the 10×10 fuel-rod matrix includes a first rod group comprising two pairs of part-length rods arranged on either side of a corner of the square water-passage, and a second rod group comprising two pairs of part-length rods and at least two non-paired part-length rods, each of the two pairs and the at least two non-paired part-length rods located in a corresponding outermost row or column of the matrix adjacent a corresponding side of the tube.

2. The fuel bundle of claim 1, wherein a plurality of voids are formed above upper ends of each of the part-length fuel rods to the top of the fuel bundle, and wherein the voids are configured to trap neutrons when filled with water for improving a shutdown margin for the boiling water reactor.

3. The fuel bundle of claim 1, wherein there are a total of eleven part-length rods within the 10×10 matrix.

* * * * *